United States Patent [19]

Albrinck et al.

[11] Patent Number: 5,456,949
[45] Date of Patent: Oct. 10, 1995

[54] METHOD OF PRODUCING DAMAGE RESISTANT DECORATIVE LAMINATE

[75] Inventors: Donald J. Albrinck; Ronald J. Keeling, both of Cincinnati, Ohio

[73] Assignee: Formica Technology Inc., Wilmington, Del.

[21] Appl. No.: 366,001

[22] Filed: Dec. 29, 1994

Related U.S. Application Data

[60] Continuation of Ser. No. 126,827, Sep. 24, 1993, abandoned, which is a division of Ser. No. 719,158, Jun. 21, 1991, Pat. No. 5,288,540.

[51] Int. Cl.⁶ .............................. B05D 1/36; B05D 1/18; B05D 3/02
[52] U.S. Cl. .................. 427/411; 427/370; 427/203; 427/439; 156/307.4; 156/307.5
[58] Field of Search ................... 427/411, 382, 427/370, 203, 204, 439; 156/277, 307.4, 307.5

[56] References Cited

U.S. PATENT DOCUMENTS

| | | | |
|---|---|---|---|
| Re. 30,233 | 3/1980 | Lane et al. | 427/203 |
| Re. 32,152 | 5/1986 | Scher et al. | 428/148 |
| 3,968,291 | 7/1976 | Chevallier | 428/203 |
| 3,975,572 | 8/1976 | Power | 428/453 |
| 4,196,033 | 4/1980 | Arai et al. | 427/258 |
| 4,255,480 | 3/1981 | Scher et al. | 156/277 |
| 4,263,081 | 4/1981 | Scher et al. | 156/277 |
| 4,305,987 | 12/1981 | Scher et al. | 428/148 |
| 4,322,468 | 3/1982 | Raghava | 427/372.2 |
| 4,327,141 | 4/1982 | Scher et al. | 428/148 |
| 4,395,452 | 7/1983 | Scher et al. | 427/180 |
| 4,400,423 | 8/1983 | Scher et al. | 427/180 |
| 4,430,375 | 2/1984 | Scher et al. | 428/148 |
| 4,473,613 | 9/1984 | Jaisle et al. | 428/220 |
| 4,499,137 | 2/1985 | O'Dell et al. | 428/211 |
| 4,517,235 | 5/1985 | Ungar et al. | |
| 4,520,062 | 5/1985 | Ungar et al. | 428/148 |
| 4,532,170 | 7/1985 | O'Dell et al. | 428/143 |
| 4,567,087 | 1/1986 | O'Dell et al. | 156/222 |
| 4,713,138 | 12/1987 | Ungar et al. | |
| 4,713,299 | 12/1987 | Taylor et al. | |
| 4,741,946 | 5/1988 | Ungar et al. | |
| 4,781,781 | 11/1988 | Hallworth | 427/393 |
| 4,880,689 | 11/1989 | Park et al. | 156/278 |
| 4,898,849 | 2/1990 | Kang | |
| 4,910,070 | 3/1990 | Al'Hariri | 427/152 |
| 4,940,503 | 7/1990 | Lindgren et al. | |
| 4,971,855 | 11/1990 | Lex et al. | |
| 4,999,335 | 3/1991 | Mruk et al. | |
| 5,047,440 | 9/1991 | Wilson, Jr. | |

FOREIGN PATENT DOCUMENTS 1321473  6/1973  United Kingdom.

*Primary Examiner*—Diana Dudash
*Attorney, Agent, or Firm*—Michael O. Warnecke; Deborah S. Ruff; Daniel J. Hulseberg

[57] ABSTRACT

Damage resistant high pressure decorative laminate having excellent scratch, mar, scrape and abrasion resistance, as well as excellent appearance and cleanability and methods of producing same.

The method of producing the decorative laminate includes applying a mixture of a liquid thermosetting resin and an abrasion resistant composition, followed by a second coat of the resin without the abrasion resistant composition, or with one having smaller abrasion resistant particles than in the first coat.

15 Claims, No Drawings

METHOD OF PRODUCING DAMAGE RESISTANT DECORATIVE LAMINATE

This is a continuation of application Ser. No. 08/126,827 filed on Sep. 24, 1993, now abandoned, which is a division of application Ser. No. 07/719,158 filed on Jun. 21, 1991, now patented as U.S. Pat. No. 5,288,540.

BACKGROUND OF THE INVENTION

This invention generally relates to a high pressure damage resistant decorative laminate having excellent scratch, mar, scrape and abrasion resistance, as well as excellent appearance and cleanability and methods of producing the same. More particularly, this invention relates to damage resistant, decorative laminates employing a decorative sheet saturated with a melamine-formaldehyde resin coating incorporating abrasive materials.

Conventionally, high pressure decorative laminates are made of two essential layers: a core layer and a surface layer. The core layer constitutes a bottom or supporting layer onto which the other layer is bonded. In normal high-pressure laminate manufacture, the core layer consists of a plurality of cellulosic sheets. The core sheets are generally made from a kraft paper impregnated with a laminating resin. Laminating resins commonly used for the core layer include phenolic, amino, epoxy, polyester, silicone, and diallyl phthalate resins to name a few. The industrially preferred laminating resin for decorative laminates is a phenolic resin made from the reaction of phenols with formaldehyde.

Placed above the core layer is a decorative layer which is generally an alpha cellulose pigmented paper containing a print, pattern design or solid color that has been impregnated with a melamine-formaldehyde resin.

The cured melamine-formaldehyde resins are colorless and resistant to light; they are resistant to a variety of solvents and stains; and their heat resistance make them resistant to burning cigarettes, boiling water and heated containers up to about 325° F. Without these melamine-formaldehyde resins, the decorative laminate industry would not exist as it is known today. However, because these resins are extremely brittle, they sometimes require reinforcement.

When the decorative layer of the laminate is a printed pattern, it is covered with an overlay as it is commonly referred to, which is a high-quality alpha cellulose paper impregnated with a melamine-formaldehyde resin. This layer protects the decorative print from external abuse such as abrasive wear and tear, harsh chemicals, burns, spills and the like. It is primarily the melamine-formaldehyde resin which accounts for these protective properties of the laminate. The alpha-cellulose paper acts as a translucent carrier for the water-thin resin, imparts strength to the rather brittle melamine-formaldehyde resin, maintains a uniform resin thickness in the overlay by acting as a shim, and controls resin flow.

The core layer, decorative layer and the overlay surface layer (when needed) are stacked in a superimposed relationship, between steel press plates and subjected to a pressure and temperature for a time sufficiently long enough to cure the laminating resins impregnating the respective layers. The elevated temperature and pressure actually cause the impregnated resins within the sheets to flow, which consolidates the whole into an integral mass known as the laminate. These laminates are used as surfacings for counter tops, table tops, furniture, store fixtures and the like. However, these conventional high pressure laminates can be easily damaged by scraping or marring caused by objects sliding across the surface of the laminate.

Abrasive materials have previously been employed in the overlay sheet or solid color decorative sheet in order to improve the abrasion resistance of these high pressure decorative laminates. The abrasive materials are generally deposited upon the alpha cellulose matrix or, in other applications, mixed with a binder such as cellulosic fibers or microcrystalline materials replacing the alpha cellulose overlay sheet. Damage resistant high pressure decorative laminates incorporating abrasive materials are well known. However, these damage resistant decorative laminates have required the presence of a binder material preferably microcrystalline cellulose in order to bind the abrasive materials to the overlay or decorative sheet. Also, these damage resistant high pressure decorating laminates have been produced by difficult and expensive multi-step processes which requires that the abrasive material and binder be added in a separate step from the resin material and requiring that the decorative sheet be first coated with the abrasive materials and the binder material and then dried to bind the abrasive materials to the decorative sheet. The decorative sheet would then be impregnated with a thermosetting resin. Additionally, those damage resistant laminates which have the most durable surfaces generally have dull, non-uniform, unattractive surfaces that feel rough, grab and hold dirt, and are difficult to clean.

Thus, there exists a need for a damage resistant decorative laminate which has excellent scratch, mar and scrape resistance and which does not need to employ the use of a binder material to bind the abrasion resistant particles to the decorative sheet. Additionally, there exists a need for a damage resistant decorative laminate that can be produced without the costly multi-step process which requires separate coating and drying steps to adhere the abrasion resistant particles and binder material and impregnating steps to apply the resin. Further, there exists a need for a damage resistant laminate which has a very uniform appearance, an attractive sheen, a smooth feel and easy cleanability.

DESCRIPTION OF THE PRIOR ART

Prior art procedures for the manufacture of abrasion-resistant decorative laminates, such as those taught in U.S. Pat. No. 4,255,480, have generally required a multi-step process in which the decorative facing sheet is first coated with a binder/mineral mixture and then dried to bind the abrasion-resistant mineral to the decorative sheet. The dry coated decorative sheet is then impregnated with a thermosetting resin. However, this particular prior art process calls for the utilization of a binding material compatible with the thermosetting resin, namely microcrystalline cellulose, to bind the mineral particles to the decorative sheet. Thus, this prior art process requires a specific binding compound compatible with the thermosetting resin, and separate coating, drying and impregnating steps to add the abrasion resistant particles, binder and resin.

Others have attempted production of mar resistant decorative laminates. For instance, U.S. Pat. No. 4,263,081 teaches the production of a mar-resistant laminate but further requires that a second layer of binder/mineral mixture be provided immediately below or above the first binder/mineral layer.

U.S. Pat. No. 4,305,987 is directed to an abrasion-resistant laminate meeting National Electric Manufacturers' Association (NEMA) standards relating to abrasive wear, stain resistance, heat resistance, impact resistance, dimensional stability and the like. The patent discloses a "stabilizing binder material" for the abrasion-resistant mineral. The patent also teaches the use of microcrystalline cellulose as the preferred binder material, acting as a suspending and binding agent and also compatible with melamine and polyester laminating resins.

U.S. Pat. No. 4,327,141 discloses an abrasion-resistant decorative laminate meeting National Electric Manufacturers Association (NEMA) standards. The abrasion-resistant laminate requires an additional layer of binder material immediately below or above the abrasion resistant coating.

U.S. Pat. No. 4,395,452 discloses a print sheet for use in the preparation of abrasion-resistant decorative laminates, and requires the presence of binder material "in an amount sufficient to bind and stabilize" the abrasion-resistant mineral to the surface of the paper sheet.

U.S. Pat. No. 4,400,423 also discloses a print sheet for use in the preparation of abrasion-resistant decorative laminates, however additionally discloses use of an additional layer of binder material immediately above or below the abrasion-resistant coating.

U.S. Pat. No. 4,430,375 teaches a decorative sheet for use in the preparation of abrasion-resistant decorative laminates and the use of a binder material. Additionally, the process for producing the laminate discloses a separate drying step to enhance the bonding of the abrasion-resistant mineral particles to the decorative sheet.

U.S. Pat. No. 4,499,137 discloses a scuff-resistant decorative laminate utilizing a wax lubricant having a melt temperature below 260° F. so as to avoid haze in the laminate.

Both U.S. Pat. Nos. 4,517,235 and 4,520,062 disclose an abrasion-resistant coating for decorative laminates in which a binder/mineral coating is transferred from a mold surface or flexible tape to the surface of the laminate. Additionally, a transfer carrier containing a non-resinous binder material and mineral abrasive particles is disclosed.

U.S. Pat. No. 4,532,170 discloses a facing sheet for a scuff-resistant decorative laminate, comprising a particulate lubricant and binder material for the lubricant particles, but excluding oxidized wax and silicone resin lubricants.

U.S. Pat. No. 4,567,087 teaches a scuff-resistant and abrasion-resistant decorative laminate comprising abrasion-resistant particles, binder material for the particles, and a lubricant which is not an oxidized wax or silicone resin.

U.S. Pat. No. 4,713,138 discloses a single step method of preparing a facing sheet for use as the uppermost sheet in the manufacture of an abrasion-resistant decorative laminate. The method teaches a binding material for the mineral that (1) withstands the subsequent laminating conditions, (2) is compatible with the thermosetting resin, (3) is present in an amount sufficient to bind the abrasion-resistant mineral to the surface of an unsaturated paper sheet, and (4) suspends the abrasion-resistant mineral particles in the liquid thermosetting resin.

Finally, U.S. Pat. No. 4,741,946 discloses scuff and abrasion-resistant decorative laminates in which finely divided lubricant wax particles are incorporated in or very near the surface of the solid-colored decorative paper. The lubricant is disclosed as not being an oxidized wax or silicone resin.

SUMMARY OF THE INVENTION

It is a principal object of this invention to provide laminates having excellent resistance to all known types of physical damage to the surface that cause marring or defacement. This includes scraping by a relatively sharp object of about equal hardness to the laminate resulting in a burnish mark (polished streak) or a chalk mark (transfer of material from the abrading object to the laminate); scratching by a very sharp object of about the same hardness as the grit in the laminate resulting in a groove of plowed away material; and marring such as a series of very closely spaced scratches caused by many very fine particles of about equal hardness to the grit in the laminate such as contained in sandpaper, a scouring pad or air-borne dirt trapped beneath a tool used to fabricate a laminate or an object slid across the installed laminate.

It is a further object of this invention to provide the above mentioned excellent scratch, mar, scrape and abrasion resistance in a laminate having a very even, uniformly fine textured finish providing a surface gloss of about 14 (60° NEMA gloss).

It is a further object of this invention to provide the above mentioned excellent scratch, mar, scrape and abrasion resistance in a laminate which does not need to employ the use of a binder material to bind the abrasion resistant particles to the decorative sheet.

It is a further object of this invention to provide a damage resistant decorative laminate which can be produced without a costly multi-step process requiring separate coating and drying steps to adhere the abrasion resistant particles and binder material and impregnating steps to apply the resin.

It is still a further object of this invention to provide a damage resistant decorative laminate which has easy cleanability.

The foregoing objects and others are accomplished in accordance with the present invention by employing the preferred embodiments of the invention.

These and other objects of the present invention will be apparent from the detailed description given hereinafter. However, it should be understood that the detailed description and specific examples, while indicative of the preferred embodiment of the invention, are given by way of illustration only, because various changes and modifications within the spirit and scope of the invention will become apparent from this detailed description to those skilled in the art.

In accordance with these objectives of the present invention, a new damage resistant high pressure decorative laminate has been developed which does not utilize a binder and which can be prepared without a costly multi-step coating, drying and impregnating to apply the abrasion resistant material, binder and resin. Additionally, the laminate has excellent resistance to scratching, marring, scraping and abrasion, and has a very uniform appearance and easy cleanability.

The damage resistant decorative laminates having excellent scratch, mar, scrape and abrasion resistance utilize a coating formulation which comprises a thermosetting resin; abrasion resistant particles, of a particle size and in a concentration sufficient to provide for abrasion resistance; a coupling agent in an amount dependent upon the concentration of the abrasion resistant particles a thickening agent in an amount sufficient to suspend the abrasion resistant particles; and a lubricating agent in a concentration sufficient to impart scrape resistance to the decorative laminate.

DETAILED DESCRIPTION OF THE EMBODIMENTS

The damage resistant decorative laminate utilizes a coating formulation mixture of melamine-formaldehyde resin and abrasion resistant material, preferably alumina particles. In its preferred form, the resin coating formulation is composed of a mixture of alumina particles of about 15 microns to about 45 microns in particle size, with the average particle size being about 30 microns. The concentration of alumina particles in the resin coating formulation will depend upon the amount of surface area which needs to be covered. However, for sufficient damage resistance the concentration of alumina particles should be about 8 to 12 grams per square meter of surface area. Additionally, the alumina particles must either be precoated with an amino silane coupling agent such as Dow Corning Z6020 or Union Carbide A-1120. If the alumina particles are not precoated, the silane coupling agent must be added to the resin coating formulation at about 2.5 percent based upon the concentration of alumina particles in the coating formulation. Unexpected benefits were found when adding the silane coupling agent to the resin coating formulation. First, the silane coupling agent was found to reduce the surface friction of the laminate by about 10 percent, thereby allowing abrasive objects to slide more easily over the surface of the laminate. Secondly, when higher concentrations of alumina particles are used, haziness often appears in dark color laminates. However, it was found that the addition of the silane coupling agent eliminates this haziness in dark color laminates.

The resin coating formulation additionally contains from about 1 percent to about 4 percent polyvinyl alcohol; from about 0.05 percent to about 0.25 percent xanthan gum thickener; and from about 0.05 percent to about 0.25 percent polyethylene glycol distearate. Preferably, the resin coating formulation contains about 2.5 percent polyvinyl alcohol; about 0.1 percent xanthan gum thickener; and about 0.1 percent polyethylene glycol distearate. The melamine-formaldehyde resin may also be modified with a plasticizer and an acid catalyst if a more flexible damage resistant laminate is desired. The preferred catalyst is paratoluene sulfonic acid. However, any kind of acid such as magnesium bromide, hydrochloric acid, sulfuric acid or the like may be utilized as a catalyst.

The polyvinyl alcohol contained in the resin coating formulation acts as an auxiliary slip agent. A polyethylene wax known by the tradename AC316 from Allied Chemical Company was evaluated as an auxiliary slip agent, however was found to impart haze and blur to the resulting decorative laminate. The polyvinyl alcohol functions to impart resistance to marks from sliding objects (sometimes referred to as "scuff" resistance) to the resulting laminate.

An alginate thickener such as xanthan gum contained in the resin coating formulation acts to suspend the abrasive particles. The polyethylene glycol distearate contained in the resin coating formulation acts to enhance surface slip and improve scrape resistance of the laminate. Polyethylene glycol distearate used in the resin coating formulation is the preferred lubricating agent, as it provides scrape resistance. Zinc stearate and other lubricating compounds were evaluated for scrape resistance, but were found less effective.

The coating formulation may also contain a small amount (0.01–0.1 percent) of a surfactant designed to reduce surface tension of the coating to provide a smooth and a uniform deposition of the coating. An example of such agent is Silwet® L-77 from Union Carbide Co. L-77 is a dimethylpolyoloxane.

The damage resistant high pressure decorative laminate of the present invention is produced by a one step coating/saturation process in which the abrasion resistant particles having a particle size of about 15 microns to about 45 microns, with the average particle size being about 30 microns are suspended directly in the melamine-formaldehyde resin coating formulation. The melamine-formaldehyde resin coating formulation containing the abrasion resistant alumina particles is applied directly to the top side of a decorative alpha-cellulose paper preferentially using a sparge pipe applicator. With the sparge pipe applicator, the resin coating formulation is applied to a decorative paper sheet using a sparge pipe having many holes to spread the resin coating formulation uniformly across the top side of the decorative paper. About 50 to about 80 percent of the total resin requirement is applied by this coating step so that the final laminate product contains about 8 to about 12 grams per square meter of the abrasion resistant alumina particles.

The resin impregnated decorative sheet is then further coated or saturated with an overcoat of a "neat" melamine-formaldehyde resin coating formulation, one which does not contain any abrasion resistant alumina particles or in the alternative may be coated with a resin coating formulation containing about 5 percent of abrasion resistant alumina particles having an average particle size of about 3 microns. Whether or not this overcoat resin formulation contains the abrasion resistant alumina particles, this overcoat resin coating formulation preferably is applied by dipping and contains about 0.1 to about 0.2 percent of an alginate thickener such as xanthan gum to improve coatability and about 0.1 to about 0.2 percent of polyethylene glycol distearate which acts as a surface lubricant to further reduce abrasive friction. The damage resistant decorative laminate may be produced either with or without an intermediate drying step between the initial coating of the resin formulation containing the abrasion resistant alumina particles and the subsequent coating to apply the overcoat resin formulation.

The coated decorative paper and at least one backing sheet is dried and then heat and pressure consolidated using conventional laminating techniques into a damage resistant high pressure decorative laminate having excellent scratch, mar, scrape and abrasion resistance as well as a uniform appearance and excellent cleanability.

In order to further define the specifics of the present invention, the following examples are provided and intended to illustrate the damage resistant high pressure decorative laminate and the process for producing the laminate, and not to limit the particulars of the present invention:

EXAMPLE 1

Wear resistant laminate samples having a matte finish were subjected to nine different testing procedures to measure scratch, mar, scrape and abrasion resistance, as well as cleanability and appearance. The wear resistant laminate samples tested included:

(1) The high pressure damage resistant decorative laminate of the instant invention having a decorative sheet impregnated with a resin coating formulation containing abrasion resistant alumina particles with an average particle size of 30 microns and which had been further impregnated with a "neat" resin overcoat formulation containing no abrasion resistant alumina particles.

(2) A high pressure wear resistant decorative laminate having a decorative sheet impregnated with a resin coating formulation containing a mixture of 2 parts abrasion resistant alumina particles having a particle size of about 25 microns and 1 part abrasion resistant alumina particles having a particle size of about 3 microns.

(3) A high pressure wear resistant laminate known as NEVAMAR ARP®

Each of the above-described laminate samples were subjected to the following test procedures:

I. SANDPAPER FRICTION TEST

This test was designed to measure the ease with which a highly abrasive object could be moved across the laminate surface, thus indicating the laminate's durability throughout rough fabricating operations when the laminate is fabricated into a particular end-product.

Each of the three laminate samples described above were subjected to a square (2½"×2½") of course 60 grit alumina sandpaper placed under a metal block. The block was then loaded with a 10 pound weight. The block with the weight and sandpaper was then drawn across the laminate at a rate of about 50" per minute over a distance of 7", using a force measuring gauge. The minimum, maximum and average frictional forces were measured. The lower the number result, the easier to move the abrasive object over the laminate and the more durable the laminate in fabricating operations.

The results appear in TABLE I below.

TABLE I

| SAMPLE | AVE. (lbs) | RANGE (lbs) |
|---|---|---|
| (1) | 4.3 | 5.3–3.0 |
| (2) | 5.7 | 6.3–5.3 |
| (3) | 4.6 | 5.5–3.6 |

The results in TABLE 1 show that the laminate of the instant invention is more resistant to abusive damage than either of the other laminate samples.

II. GLASS SCRATCH TEST

This test was designed to measure the ease with which a laminate could be scratched using a material of similar sharpness and hardness to ordinary silica, the usual scratching component in air-borne dirt. Scratches are very thin lines, usually several inches long and widely spaced one from another. Material is plowed out by the scratch-inducing agent and the indentation in the laminate surface can usually be felt by running a fingernail over it.

Each of the 3 laminate samples described above were scratched four times with the edge of a glass microscope slide (Fisher brand Cat. No. 12-550A 75×25 mm— non-frosted) held in a device to which loads of 25, 50, 100 and 200 grams could be applied. The laminate surfaces were observed visually and the resulting surface scratches were rated on a 0–3 scale for intensity as follows:

```
0 = no mark visible under these conditions
1 = faint scratch visible when titled to a
    critical viewing angle
2 = visible scratch that will disappear at a
    critical viewing angle
3 = scratch easily visible at any angle under
    these viewing conditions.
```

The results for each scratch were then multiplied by 8, 4, 2 and 1 as weighing factors for each of the respective gram loads and the results were then totalled for all scratches on the particular laminate sample. The results appear in TABLE II below.

III. MAR-TEST

The mar resistance of each of the laminate samples was determined by rubbing the laminate surface under controlled conditions with an abrasive cloth (Scotch-Brite® scouring pad) and then measuring the change in surface gloss of the marred area as compared to the original surface gloss. The change in surface gloss was measured by a 60° glossmeter manufactured by Gardner Laboratory Division, Bethesda, Md.

The mar resistance for each laminate sample was calculated as follows:

$$G = \frac{100 \times (\text{original gloss} - \text{final gloss})}{(\text{original gloss})}$$

Mar resistance tends to depend disporportionately on the original background gloss of the laminate. The glossier the laminate, the higher the G value. G is the percent change in gloss (mar resistance). Generally, a % G of less than 10 percent appears as very little damage to the laminate surface. Burnishing (surface gloss increase), will be a negative value.

The results of the mar resistance for each laminate sample are set forth below in TABLE II.

IV. SCRAPE TEST

This test was intended to measure the likelihood of the surface of one laminate to be scraped by the sharp corner of the surface of another laminate being dragged across it. Scrape is a long, narrow streak that may appear as a burnish (higher gloss) or as a whitish, chalky mark.

Each of the laminate samples were scraped for one cycle and for five cycles using a sharp decorative laminate corner loaded with a 2 kg. weight. The laminate surfaces of the samples were then visually observed and the surface scrapes were rated as follows:

```
0 = no visible mark.

1 =  a burnish (higher gloss) mark that disappears
     as the sample is rotated to various angles.

2 = a burnish mark visible to all viewing angles.

3 =  a chalk mark that disappears as the sample is
     rotated at various angles.

4 = a chalk mark visible to all viewing angles.
```

If the scrape appeared to "skip" such as a burnish to chalk or burnish to nothing, the scrape was graded according to the greatest severity of the scrape.

The results of the test was totalled and averaged for all scrapes on the particular laminate sample. The results appear in TABLE II below.

V. ABRASION TEST

This test measured the ability of the surface of a high pressure wear resistant decorative laminate to maintain its design and color when subjected to abrasive wear.

Each of the laminate samples were uniformly abraded for a fixed number of cycles using 180 grit alumina oxide sandpaper. The resulting groove depth in the laminate surface was measured to determine abrasion resistance. The results of the abrasion resistance test was summarized below in TABLE II.

VI. GLOSS TEST

The gloss of the surface of the damage resistant decorative laminate was measured at 60° with a Gardner gloss meter using the NEMA LD 3-1985 3.13 method. The results of the gloss test are summarized below in TABLE II.

TABLE II

| SAMPLE | Ave. Scratch (0–45) | Ave. Mar (% G) | Ave. Scrape (0–4) 1 cycle, | 5 cycles | Abrasion (mils.) | Ave. Gloss |
|---|---|---|---|---|---|---|
| (1) | 13.6 | 5.2 | 1.3, | 2.3 | 0.4 | 13.7 |
| (2) | 13.0 | –7.5 | 1.9, | 2.2 | 0.8 | 13.7 |
| (3) | 11.7 | –5.2 | 2.4, | 2.9 | 0.7 | 7.8 |

VII. TACTILE TEST

This test was performed by lightly moving the fingertips over the laminate surface and observing the feel and sound. The results of the tactile test are summarized in TABLE III.

VIII. ALUMINUM CAN TEST

This test was performed by sliding a moist aluminum can rapidly back and forth ten times over the laminate surface using about 5 lbs. of downward force. The gray metal rub off from the can is then cleaned off the laminate with soapy water and the amount of remaining smudge is observed.

The results of the aluminum can test are summarized in TABLE III.

IX. PENCIL MARK TEST

This test was performed by marking the laminate surface with a line from a No. 2 pencil. The pencil line was then removed from the laminate with soap and water and the remaining mark was observed.

The results of the pencil test are summarized in TABLE III.

TABLE III

| SAMPLE | TACTILE TEST feel | sound | ALUMINUM CAN TEST | PENCIL TEST |
|---|---|---|---|---|
| (1) | smooth | none | mark easily removed | mark easily removed |
| (2) | smooth | none | mark easily removed | mark easily removed |
| (3) | rough | grating | heavy trace or shadow remaining | distinct trace remaining |

What is claimed is:

1. A process for the production of decorative laminates, the process comprising the steps of:

preparing a mixture of a liquid thermosetting, impregnating resin and an abrasion resistant composition, said abrasion resistant composition including
(1) coated abrasion resistant mineral particles having a particle size of about 15 microns to about 45 microns;
(2) a thickening agent to suspend said abrasion resistant mineral particles; and
(3) lubricating agents for scrape resistance;

coating and impregnating a decorative paper sheet with said mixture of thermosetting resin and abrasion resistant composition such that about 50 percent to about 80 percent by weight of an amount of said resin is impregnated into said decorative sheet to form a resin coated and impregnated decorative sheet;

applying to said resin coated and impregnated decorative sheet said thermosetting resin, neat, to further coat the resin coated and impregnated decorative sheet such that the remainder of said amount of said thermosetting resin is impregnated into said resin coated and impregnated decorative sheet;

drying said resin coated and impregnated decorative sheet with the remainder of said amount of said resin impregnated therein; and consolidating said resin coated and impregnated decorative sheet using heat and pressure to obtain a high pressure decorative laminate.

2. The process according to claim 1, wherein said abrasion resistant particles are alumina.

3. The process according to claim 1, wherein said thickening agent is xanthan gum.

4. The process according to claim 1, wherein said lubricating agents are selected from polyvinyl alcohol and polyethylene glycol distearate.

5. The process according to claim 1, wherein the applying step includes dipping the resin coated and impregnated decorative sheet into the neat thermosetting resin.

6. A process for the production of decorative laminates, the process comprising the steps of:

preparing a mixture of a liquid thermosetting, impregnating resin and an abrasion resistant composition, said abrasion resistant composition including
(1) abrasion resistant mineral particles having a particle size of about 15 microns to about 45 microns;
(2) a coupling agent;
(3) a thickening agent to suspend said abrasion resistant mineral particles; and
(4) lubricating agents for scrape resistance;

coating and impregnating a decorative paper sheet with said mixture of thermosetting resin and abrasion-resistant composition such that about 50 percent to about 80 percent by weight of an amount of said resin is impregnated into said decorative sheet to form a resin coated and impregnated decorative sheet;

applying to said resin coated and impregnated decorative sheet a second mixture of said thermosetting resin and abrasion resistant composition including abrasion resistant particles having a particle size of about 3 microns to further coat the resin coated and impregnated decorative sheet such that the remainder of said amount of said resin is impregnated into said resin coated and impregnated decorative sheet;

drying said resin coated and impregnated decorative sheet with the remainder of said amount of said thermosetting resin impregnated therein; and consolidating said resin coated and impregnated decorative sheet using heat and pressure to obtain a high pressure decorative laminate.

7. The process according to claim 6, wherein the applying step includes dipping the resin coated and impregnated decorative sheet into the second mixture of said thermosetting resin and said second abrasion resistant composition.

8. A process for the production of decorative laminates, the process comprising the steps of:

preparing a mixture of a liquid thermosetting, impregnating resin and an abrasion resistant composition, said abrasion resistant composition including
(1) coated abrasion resistant mineral particles having a particle size of about 15 microns to about 45 microns;
(2) a thickening agent to suspend said abrasion resistant mineral particles; and
(3) lubricating agents for scrape resistance;

coating and impregnating a decorative paper sheet with said mixture of thermosetting resin and abrasion-resistant composition such that about 50 percent to about 80 percent by weight of an amount of said resin is impregnated into the decorative sheet to form a resin coated and impregnated decorative sheet;

drying said resin coated and impregnated decorative sheet;

applying to said resin coated and impregnated decorative sheet said thermosetting resin, neat, to further coat the resin coated and impregnated decorative sheet such that the remainder of said amount of said resin is impregnated into the resin coated and impregnated decorative sheet;

drying said resin coated and impregnated decorative sheet with the remainder of said amount of said resin impregnated therein; and consolidating said resin coated and impregnated decorative sheet using heat and pressure to obtain a high pressure decorative laminate.

9. The process according to claim 8, wherein the applying step includes dipping the resin coated and impregnated decorative sheet into the neat thermosetting resin.

10. A process for the production of decorative laminates, the process comprising the steps of:

preparing a mixture of a liquid thermosetting, impregnating resin and an abrasion resistant composition, said abrasion resistant composition including
(1) abrasion resistant mineral particles having a particle size of about 15 microns to about 45 microns;
(2) a coupling agent;
(3) a thickening agent to suspend said abrasion resistant mineral particles; and
(4) lubricating agents for scrape resistance;

coating and impregnating a decorative paper sheet with said mixture of thermosetting resin and abrasion-resistant composition such that about 50 percent to about 80 percent by weight of an amount of said resin is impregnated into the decorative sheet to form a resin coated and impregnated decorative sheet;

drying said resin coated and impregnated decorative sheet;

applying to said resin coated and impregnated decorative sheet said thermosetting resin, neat, to further coat the resin coated and impregnated decorative sheet such that the remainder of said amount of resin is impregnated into the resin coated and impregnated decorative sheet;

drying said resin coated and impregnated decorative sheet with the remainder of said amount of said thermosetting resin impregnated therein; and consolidating said resin coated and impregnated decorative sheet using heat and pressure to obtain a high pressure decorative laminate.

11. The process according to claim 10, wherein the applying step includes dipping the resin coated and impregnated decorative sheet into the neat thermosetting resin.

12. A process for the production of decorative laminates, the process comprising the steps of:

preparing a mixture of a liquid thermosetting, impregnating resin and an abrasion resistant composition, said abrasion resistant composition including
(1) coated abrasion resistant mineral particles having a particle size of about 15 microns to about 45 microns;
(2) a thickening agent to suspend said abrasion resistant mineral particles; and
(3) lubricating agents for scrape resistance;

coating and impregnating a decorative paper sheet with said mixture of thermosetting resin and abrasion-resistant composition such that about 50 percent to about 80 percent by weight of an amount of said resin is impregnated into the decorative sheet to form a resin coated and impregnated decorative sheet;

drying said resin coated and impregnated decorative sheet;

applying to said resin coated and impregnated decorative sheet a second mixture of said thermosetting resin and a second abrasion resistant composition including abrasion resistant particles having a particle size of about 3 microns to further coat the resin coated and impregnated decorative sheet such that the remainder of said amount of resin is impregnated into the resin coated and impregnated decorative sheet;

drying said resin coated and impregnated decorative sheet with the remainder of said amount of said thermosetting resin impregnated therein; and consolidating said resin coated and impregnated decorative sheet using heat and pressure to obtain a high pressure decorative laminate.

13. The process according to claim 12, wherein the applying step includes dipping the resin coated and impregnated decorative sheet into the second mixture of said thermosetting resin and said second abrasion resistant composition.

14. A process for the production of decorative laminates, the process comprising the steps of:

preparing a mixture of a liquid thermosetting, impregnating resin and an abrasion resistant composition, said abrasion resistant composition including
(1) abrasion resistant mineral particles having a particle size of about 15 microns to about 45 microns;
(2) a coupling agent;
(3) a thickening agent to suspend said abrasion resistant mineral particles; and
(4) lubricating agents for scrape resistance;

coating and impregnating a decorative paper sheet with said mixture of thermosetting resin and abrasion-resistant composition such that about 50 percent to about 80 percent by weight of an amount of said thermosetting resin is impregnated into the decorative sheet to form a resin coated and impregnated decorative sheet;

drying said resin coated and impregnated decorative sheet;

applying to said resin coated and impregnated decorative sheet into a second mixture of said thermosetting resin and a second abrasion resistant composition including abrasion resistant particles having a particle size of about 3 microns to further coat the resin coated and impregnated decorative sheet such that the remainder of said amount of said resin is impregnated into the resin coated and impregnated decorative sheet;

drying said resin coated and impregnated decorative sheet with the remainder of said amount of resin impregnated therein; and consolidating said resin coated and impregnated decorative sheet using heat and pressure to obtain a high pressure decorative laminate.

15. The process according to claim 14, wherein the applying step includes dipping the resin coated and impregnated decorative sheet into the second mixture of said thermosetting resin and said second abrasion resistant composition.

* * * * *

UNITED STATES PATENT AND TRADEMARK OFFICE
CERTIFICATE OF CORRECTION

PATENT NO. : 5,456,949
DATED : October 10, 1995
INVENTOR(S) : DONALD J. ALBRINCK; RONALD J. KEELING It is certified that error appears in the above-indentified patent and that said Letters Patent is hereby corrected as shown below:

Claim 6, column 10, line 36 before "abrasion resistant composition" insert --a second--; and Claim 12, column 12, line 13, before "resin is impregnated" insert --said--.

Signed and Sealed this

Twenty-seventh Day of February, 1996

Attest:

BRUCE LEHMAN

Attesting Officer     Commissioner of Patents and Trademarks